(12) United States Patent
Kim et al.

(10) Patent No.: US 9,975,107 B2
(45) Date of Patent: May 22, 2018

(54) MULTI-SCALED OXYGEN STORAGE MATERIAL BASED ON CERIA-ZIRCONIA HAVING HIGH OXYGEN STORAGE AND RELEASING ABILITY AND A PREPARATION METHOD THEREOF

(71) Applicant: KOREA INSTITUTE OF SCIENCE AND TECHNOLOGY, Seoul (KR)

(72) Inventors: Hyoung Chul Kim, Seoul (KR); Hae Weon Lee, Seoul (KR); Byung Kook Kim, Seoul (KR); Jong Ho Lee, Seoul (KR); Ji Won Son, Seoul (KR); Kyung Joong Yoon, Seoul (KR); Jong Sup Hong, Seoul (KR); Seung Hak Song, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days. days.

(21) Appl. No.: 15/297,760

(22) Filed: Oct. 19, 2016

(65) Prior Publication Data

US 2017/0297000 A1 Oct. 19, 2017

(30) Foreign Application Priority Data

Apr. 14, 2016 (KR) ........................ 10-2016-0045428

(51) Int. Cl.
*B01J 20/06* (2006.01)
*B01J 20/30* (2006.01)
(Continued)

(52) U.S. Cl.
CPC ........... *B01J 20/06* (2013.01); *B01J 20/3078* (2013.01)

(58) Field of Classification Search
CPC . B01J 21/066; B01J 23/10; B01J 23/75; B01J 23/83; B01J 20/06; B01J 20/3078
See application file for complete search history.

(56) References Cited

U.S. PATENT DOCUMENTS 5,945,370 A * 8/1999 Yokoi ...................... B01J 20/06
423/263
6,585,944 B1 * 7/2003 Nunan ................. B01D 53/945
423/239.1
(Continued)

FOREIGN PATENT DOCUMENTS

JP 2015-182931 A 10/2015
KR 10-0738676 B1 7/2007

OTHER PUBLICATIONS

Prasad et al., Structural Characterization and Catalytic Activity of Ce0.65Zr0.25RE0.10 2-σ Nanocrystalline Powders Synthesized by the Glycine-Nitrate Process., The Journal of Physical Chemistry C, Jan. 5, 2012, pp. 3467-3476, vol. 116., ACS Publications.

*Primary Examiner* — Cam N. Nguyen
(74) *Attorney, Agent, or Firm* — Goldilocks ZONE IP Law (57) ABSTRACT

A multi-scaled oxygen storage material wherein cobalt element is complexed with a size of an atom or hundreds of nanometers or smaller in a ceria-zirconia solid solution and a method for preparing the same as provided.

Specifically, the multi-scaled oxygen storage material contains a ceria-zirconia solid solution, a cobalt doping contained in the solid solution in the form of an atom and a cobalt-based nanocluster dispersed in the solid solution as cobalt oxide and exhibits a microstructure distinguished from that of the existing ceria-zirconia (CZO)-based oxygen storage material as well as remarkably improved oxygen storage and release ability, and the method for preparing the same is provided.

4 Claims, 6 Drawing Sheets

(51) Int. Cl.
  *B01J 23/10* (2006.01)
  *B01J 23/75* (2006.01)
  *B01J 23/83* (2006.01)
  *B01J 21/06* (2006.01)

(56) References Cited

U.S. PATENT DOCUMENTS

| | | | |
|---|---|---|---|
| 6,797,668 B2 * | 9/2004 | Yoshikawa | B01D 53/945 502/302 |
| 7,915,195 B2 * | 3/2011 | Takeshima | B01D 53/945 502/304 |
| 2007/0244002 A1 * | 10/2007 | Kozlov | B01D 53/945 502/304 |
| 2009/0298673 A1 * | 12/2009 | Akamine | B01J 21/066 502/65 |
| 2011/0044874 A1 * | 2/2011 | Dang | B01D 53/864 423/240 S |
| 2012/0027654 A1 * | 2/2012 | Mikita | B01D 53/945 423/213.5 |
| 2014/0323294 A1 * | 10/2014 | Nagao | B01J 23/34 502/304 |

* cited by examiner

MULTI-SCALED OXYGEN STORAGE MATERIAL BASED ON CERIA-ZIRCONIA HAVING HIGH OXYGEN STORAGE AND RELEASING ABILITY AND A PREPARATION METHOD THEREOF

CROSS-REFERENCE TO RELATED APPLICATIONS

This application claims, under 35 U.S.C. § 119, the priority of Korean Patent Application No. 10-2016-0045428, filed on Apr. 14, 2016, in the Korean Intellectual Property Office, the disclosure of which is incorporated herein by reference in its entirety.

BACKGROUND (a) Technical Field

The present invention relates to a multi-scaled oxygen storage material wherein cobalt or cobalt oxide is complexed with a size of an atom or hundreds of nanometers or smaller in a ceria-zirconia solid solution and a method for preparing the same.

(b) Background Art

Materials having oxygen storage capacity (OSC) are applicable to various industries including three-way catalysts, fuel cells, preparation of synthesis gases, etc.

Ceria-zirconia ($CeO_2$—$ZrO_2$, CZO)-based oxygen storage materials are representative examples because they exhibit high OSC close to about 740 μmol-O/g at 500° C. depending on the composition of $CeO_2$ and $ZrO_2$.

However, it is assessed that further improvement of OSC of the ceria-zirconia (CZO)-based oxygen storage materials is impossible due to the materials' limitations.

Korean Patent Registration No. 10-0738676 (hereinafter, referred to as 'the patent document') discloses a catalyst with improved activity for wet oxidation of hardly degradable wastewater, wherein a transition metal such as manganese (Mn), iron (Fe), cobalt (Co), etc. is supported on a ceria-zirconia solid solution as a support.

However, the patent document merely uses the ceria-zirconia solid solution with high OSC as a support for the transition metal and does not improve the OSC of the ceria-zirconia solid solution.

As stated above, the prior art focuses only on the use of ceria-zirconia (CZO)-based oxygen storage materials and there have not been many studies on the improvement of the materials themselves.

REFERENCES OF THE RELATED ART (Patent document 1) Korean Patent Registration No. 10-0738676.

SUMMARY

The present invention is directed to providing a ceria-zirconia (CZO)-based multi-scaled oxygen storage material that exhibits higher oxygen storage and release ability than the existing materials.

The present invention is also directed to providing a ceria-zirconia (CZO)-based multi-scaled oxygen storage material which is capable of maintaining structural stability even at high temperature.

The present invention is also directed to providing a method for preparing a ceria-zirconia (CZO)-based multi-scaled oxygen storage material via a single step.

Other features and aspects of the present invention will be apparent from the following detailed description, drawings and claims.

BRIEF DESCRIPTION OF DRAWINGS

The patent or application file contains at least one drawing executed in color. Copies of this patent or patent application publication with color drawings will be provided by the Office upon request and payment of the necessary fee.

DETAILED DESCRIPTION

A ceria-zirconia (CZO)-based multi-scaled oxygen storage material (hereinafter, referred to as an 'oxygen storage material') according to an exemplary embodiment of the present invention may contain a ceria-zirconia solid solution and a cobalt doping.

The ceria-zirconia solid solution (hereinafter, referred to as a 'solid solution') is a material wherein zirconia ($ZrO_2$) is present in the fluorite structure of ceria ($CeO_2$). It exhibits superior oxygen storage and release ability because a defect for transport of oxygen is provided within the structure.

The cobalt doping may be contained in the solid solution in the form of an atom. In the present invention, "contained in the form of an atom" means that it forms the solid solution together with the ceria ($CeO_2$) and the zirconia ($ZrO_2$) of the solid solution.

The cobalt doping may be contained in the solid solution at or below a saturation concentration. In the present invention, the "saturation concentration" means the maximum concentration at which cobalt can be contained in the solid solution in the form of an atom without precipitating as cobalt oxide.

According to related literatures, the saturation concentration of the cobalt doping in the ceria-zirconia solid solution is known to be about 5 mol %. Accordingly, the oxygen storage material may contain the cobalt doping at a concentration of more than 0 to equal to or less than 5 mol %.

An oxygen storage material according to another exemplary embodiment of the present invention may contain a ceria-zirconia solid solution, a cobalt doping contained in the solid solution in the form of an atom and a cobalt-based nanocluster.

Because the ceria-zirconia solid solution and the cobalt doping were described above, only the cobalt-based nanocluster is described below.

The cobalt-based nanocluster may be dispersed in the solid solution in the form of cobalt oxide. In the present invention, "dispersed" means that the cobalt-based nanocluster adheres to or is supported on the surface or inside the solid solution with a unique crystal structure. It is distinguished from the cobalt dopping which is "contained in the form of an atom" as described above.

The cobalt-based nanocluster may be formed as cobalt oxide from cobalt which has been added to prepare the oxygen storage material at a saturation concentration or above and has precipitated from the solid solution.

That is to say, in the present invention, the cobalt which has been added at the saturation concentration below may be complexed in the form of the cobalt dopping and that which has been added at the saturation concentration or above may be complexed in the form of the cobalt-based nanocluster in the ceria-zirconia solid solution.

Accordingly, the oxygen storage material according to another exemplary embodiment of the present invention may contain the cobalt dopping at the saturation concentration and may contain the cobalt-based nanocluster at a concentration of more than 0 to equal to or less than 45 mol %.

The oxygen storage material according to the present invention may be prepared via a single-step glycine nitrate process (GNP).

Specifically, it may be prepared through (a) a step of stirring a mixture of cerium nitrate ($Ce(NO_3)_3.6H_2O$), zirconium nitrate ($ZrO(NO_3)_2$), cobalt nitrate ($Co(NO_3)_2.6H_2O$) and glycine, and then reacting the mixture, and (b) a step of calcining the mixture to obtain an oxygen storage material in the form of a powder.

It is to be understood that the constitution of the present invention is not limited to the above description but includes all the constitutions that can be derived from the overall description including examples and test examples by those of ordinary skill in the art.

The present invention provides the following effects.

The ceria-zirconia (CZO)-based multi-scaled oxygen storage material according to the present invention is applicable to various fields because it exhibits high oxygen storage and release ability and structural stability can be maintained even at high temperature.

In addition, the ceria-zirconia (CZO)-based multi-scaled oxygen storage material according to the present invention can ensure market competitiveness because it can be prepared via a single-step glycine nitrate process (GNP).

It is to be understood that the effects of the present invention are not limited to the above description but include all the effects that can be derived from the following description.

EXAMPLES

The present invention will be described in more detail through examples. The following examples are for illustrative purposes only and it will be apparent to those skilled in the art that the scope of this invention is not limited by the examples.

Example 1

Cerium nitrate [$Ce(NO_3)_3.6H_2O$], zirconium nitrate [$ZrO(NO_3)_2$] and cobalt nitrate [$Co(NO_3)_2.6H_2O$] were weighed to a stoichiometric molar ratio of 70:25:5 and then dissolved in distilled water.

Then, glycine was weighed and added such that a molar ratio of the glycine to the moles of the nitrate of the reactants (glycine/nitrate ratio, G/N ratio) was 0.55 to prepare a mixture.

The mixture was stirred for 3 hours at 200 RPM. Then, reaction was conducted by injecting the stirred mixture into a preheated beaker.

After the reaction was completed, a powder with a size of 150 μm or smaller was obtained by filtering with a sieve.

An oxygen storage material was obtained in the form of a powder by calcining the powder at 600° C. for 3 hours in the air.

The oxygen storage material in the form of a powder was milled at room temperature for 48 hours in the air after adding zirconia balls with a uniform size (Φ10 mm). Then, after removing the zirconia balls, the oxygen storage material was dried in an oven at 100° C.

Finally, an oxygen storage material with a size of 150 μm or smaller was obtained in the form of a powder by filtering again with a sieve.

Example 2

An oxygen storage material was prepared in the same manner as in Example 1, except that the stoichiometric molar ratio of cerium nitrate [$Ce(NO_3)_3.6H_2O$], zirconium nitrate [$ZrO(NO_3)_2$] and cobalt nitrate [$Co(NO_3)_2.6H_2O$] was set to 65:25:10.

Example 3

An oxygen storage material was prepared in the same manner as in Example 1, except that the stoichiometric molar ratio of cerium nitrate [$Ce(NO_3)_3.6H_2O$], zirconium nitrate [$ZrO(NO_3)_2$] and cobalt nitrate [$Co(NO_3)_2.6H_2O$] was set to 55:25:20.

Example 4

An oxygen storage material was prepared in the same manner as in Example 1, except that the stoichiometric molar ratio of cerium nitrate [$Ce(NO_3)_3.6H_2O$], zirconium nitrate [$ZrO(NO_3)_2$] and cobalt nitrate [$Co(NO_3)_2.6H_2O$] was set to 45:25:30.

Example 5

An oxygen storage material was prepared in the same manner as in Example 1, except that the stoichiometric molar ratio of cerium nitrate [$Ce(NO_3)_3.6H_2O$], zirconium nitrate [$ZrO(NO_3)_2$] and cobalt nitrate [$Co(NO_3)_2.6H_2O$] was set to 25:25:50.

Comparative Example

An existing ceria-zirconia (CZO)-based oxygen storage material not containing a cobalt dopping and a cobalt-based nanocluster was used.

Test Example 1

X-ray Diffraction Analysis

X-ray diffraction analysis was conducted on the oxygen storage materials of Examples 1-3 and Comparative Example. The result is shown in FIG. 1.

The peaks of CZO and the peaks of the cobalt-based nanocluster (cobalt oxide) are indicated by green squares and blue triangles, respectively.

Figure 1:
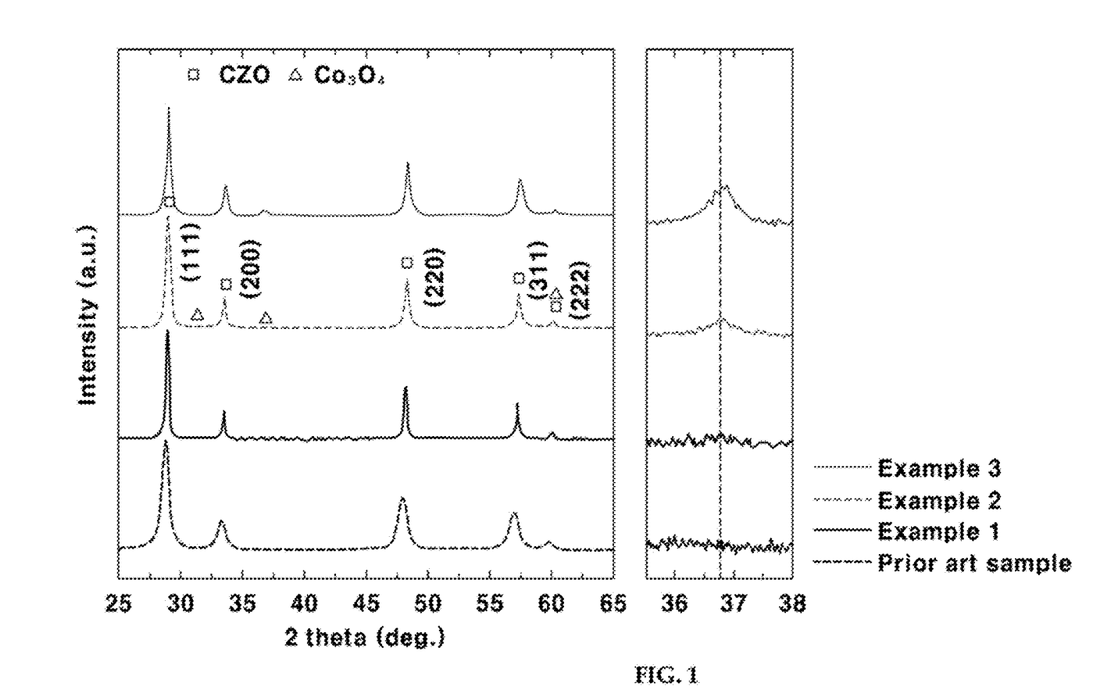
FIG. 1 illustrates a result of X-ray diffraction analysis for Examples 1-3.

The peaks at $2\theta=36-38°$ are shown on the right side in FIG. 1.

In Example 1, the oxygen storage material was prepared with 5 mol % cobalt nitrate. Referring to FIG. 1, cobalt oxide peaks are hardly seen for Example 1, which suggests that the cobalt derived from cobalt nitrate is contained in the ceria-zirconia solid solution in the form of an atom.

In Example 2 and Example 3, the oxygen storage material was prepared with 10 mol % and 20 mol % cobalt nitrate, respectively. Referring to FIG. 1, both CZO peaks and cobalt oxide peaks are observed for Example 2 and Example 3, which suggests that the cobalt derived from cobalt nitrate is complexed in the ceria-zirconia solid solution in the form of a cobalt dopping up to the saturation concentration and in the form of a cobalt-based nanocluster at higher saturation concentrations.

Test Example 2

Transmission Electron Microscopy-energy Dispersive X-Ray Spectroscopy (TEM-EDS)

Figure 2:
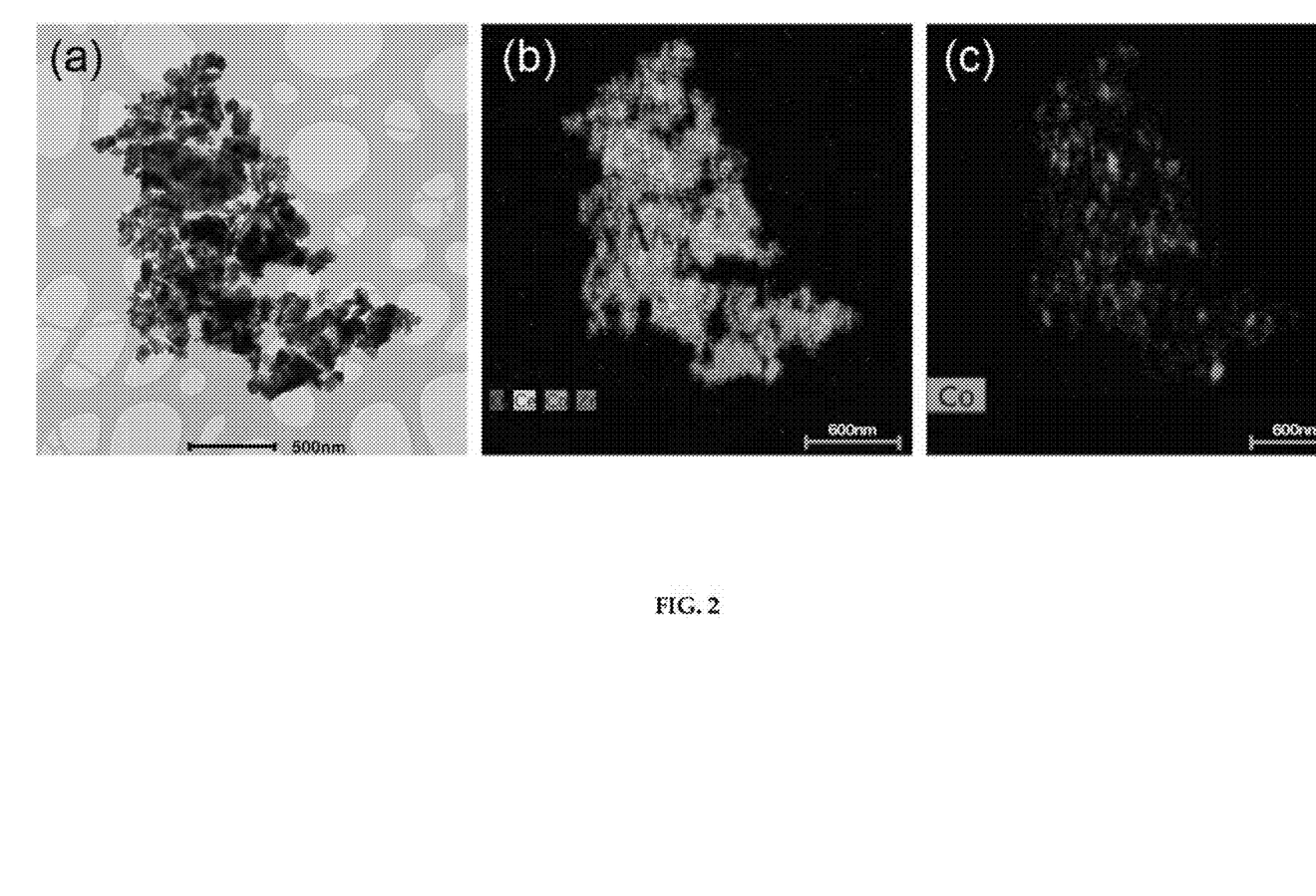
FIG. 2 illustrates TEM and EDS images for Example 2. Specifically, (a) is a TEM image and (b) and (c) are EDS images.

FIG. 2 shows TEM and EDS images of the oxygen storage material of Example 2. Specifically, (a) is a TEM image and (b) and (c) are EDS images.

(c) shows a result of mapping the distribution of cobalt only. It can be seen that the oxygen storage material of Example 2 contains both the cobalt dopping with an atomic size and the nanometer-sized cobalt-based nanocluster.

Test Example 3

Evaluation of Oxygen Storage Capacity (OSC)

The OSC of the oxygen storage materials according to Examples 1-5 and Comparative Example was measured.

The change in the weight of each oxygen storage material was measured while repeating oxidation and reduction atmospheres with oxygen and 4% hydrogen/argon at 500° C., 800° C. and 900° C. using a thermogravimetric analyzer. The result is shown in FIG. 3 and FIG. 4.

Figure 3:
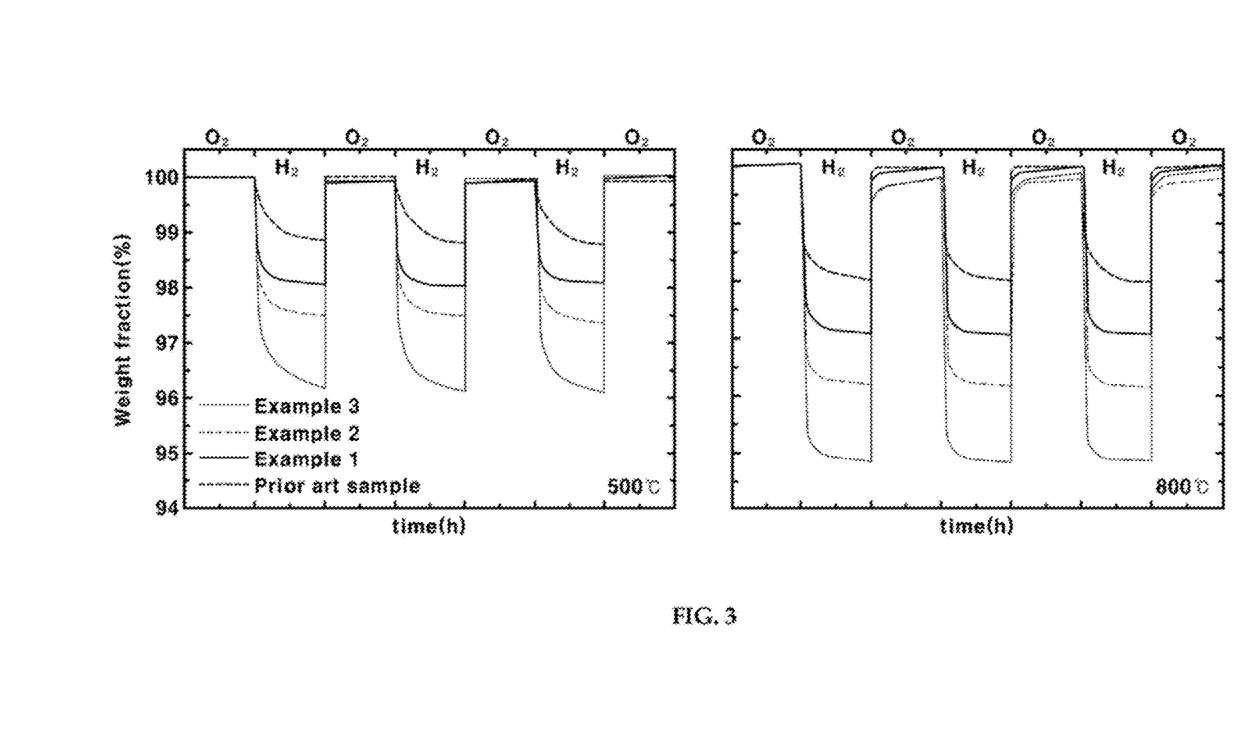
FIG. 3 illustrates a result of measuring OSC for Examples 1-3. Specifically, the change in weight was measured while repeating oxidation and reduction atmospheres with oxygen and 4% hydrogen/argon at 500° C. and 800° C.
Figure 4:
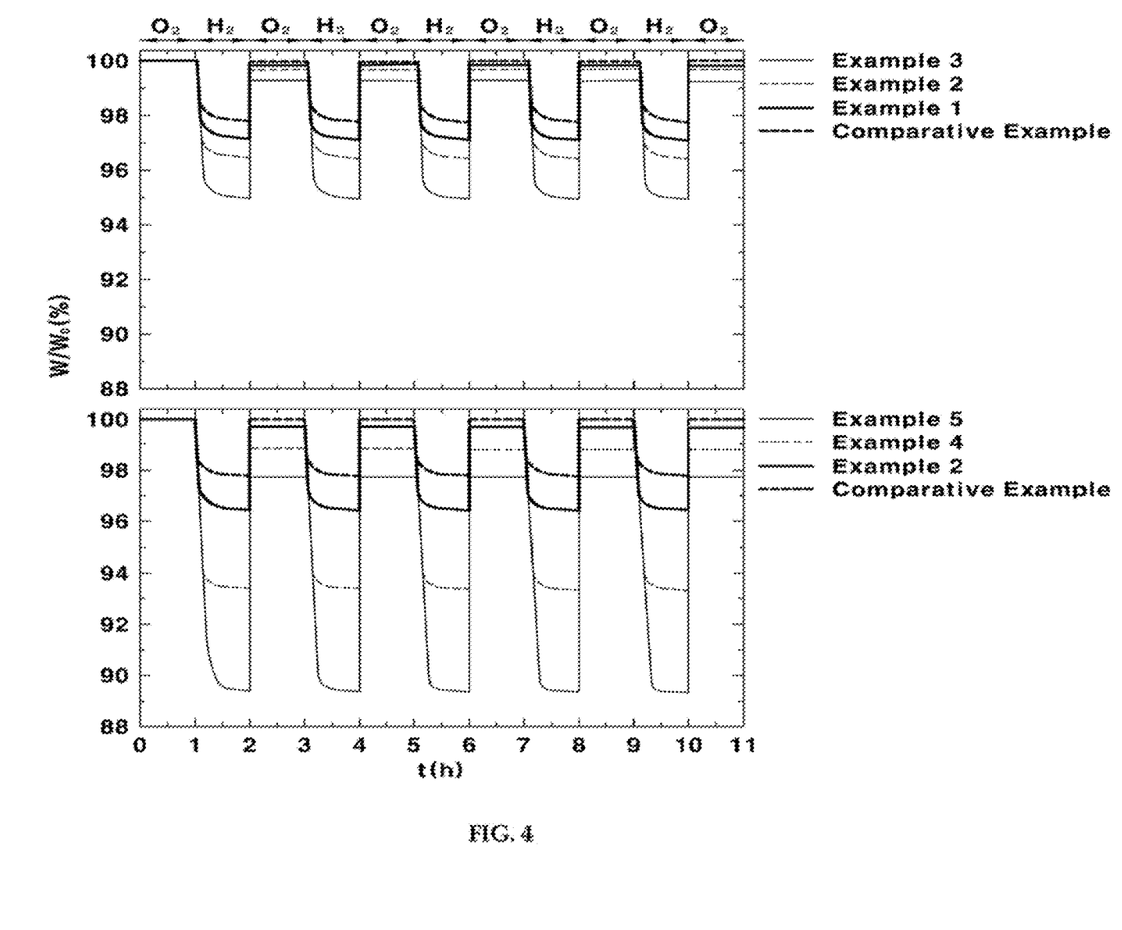
FIG. 4 illustrates a result of measuring the change in weight for Examples 1-5. Specifically, the change in weight was measured while repeating oxidation and reduction atmospheres with oxygen and 4% hydrogen/argon at 900° C.

FIG. 3 shows the result of measuring the change in weight for Examples 1-3 at 500° C. and 800° C., and FIG. 4 shows the result of measuring the change in weight for Examples 1-5 at 900° C.

From the change in the weight of the oxygen storage materials, OSC was calculated for Examples 1-5 and Comparative Example. The result is shown in Table 1.

TABLE 1

| | OSC [μmol-O/g] | |
|---|---|---|
| | 500° C. | 800° C. |
| Example 1 | 1571 | 1830 |
| Example 2 | 1615 | 2312 |
| Example 3 | 2401 | 3142 |
| Example 4 | — | 3987 |
| Example 5 | — | 5604 |
| Comparative Example | 741 | 1253 |

From Table 1, it can be seen that the oxygen storage materials according to the present invention exhibit remarkably higher oxygen storage and release ability as compared to Comparative Example.

Specifically, the OSC of Comparative Example (prior art sample) was 741 μmol-O/g at 500° C. and 1253 μmol-O/g at 800° C. and the OSC of Example 3 was 2401 μmol-O/g at 500° C. and 3142 μmol-O/g at 800° C. That is to say, the OSC for Example 3 was increased by about 3 times at 500° C. and about 2.5 times at 800° C. as compared to Comparative Example.

Accordingly, it was confirmed that the oxygen storage material according to the present invention which contains the cobalt dopping and the cobalt-based nanocluster has remarkably improved OSC.

Test Example 4

Evaluation of Reversibility Depending on Cobalt Content

From Test Example 3, it was confirmed that OSC is improved when cobalt is complexed in the ceria-zirconia solid solution. It is because cobalt is highly reducible. However, when cobalt is reduced to a metal, the oxygen storage material may shrink or the reaction rate may be negatively affected. Therefore, the reversibility of the oxygen storage material decreases if the cobalt content is too high.

In the present invention, the "reversibility" means that the oxygen storage material can repeat the cycle of storing and releasing oxygen. On the contrary, "irreversibility" mans that the oxygen storage material cannot repeat the cycle.

Figure 5:
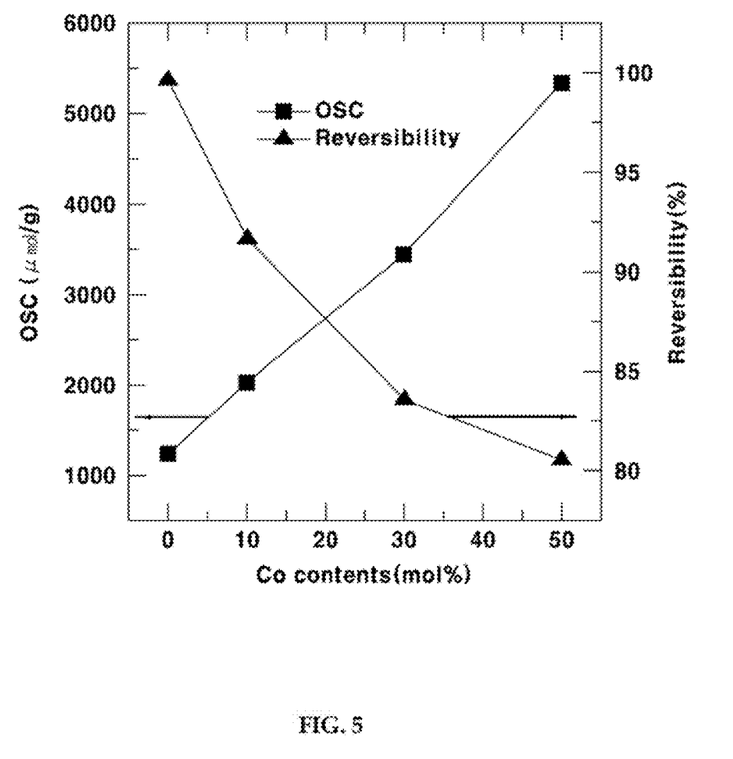
FIG. 5 illustrates a result of measuring OSC (@ 800° C.) and reversibility for Example 2, Example 4 and Example 5.

FIG. 5 shows a result of measuring OSC (@ 800° C.) and reversibility for Example 2, Example 4 and Example 5. It can be seen that, as the cobalt content is increased, OSC increases but reversibility decreases.

In order to balance the OSC and reversibility, the oxygen storage material according to the present invention may contain the cobalt dopping at the saturation concentration (5 mol %) and the cobalt-based nanocluster at a concentration of 45 mol % or below.

Test Example 5

Evaluation of Linear Thermal Expansion

In order to evaluate the structural stability of the oxygen storage materials according to the present invention, the change in linear thermal expansion was measured using a dilatometer.

Figure 6:
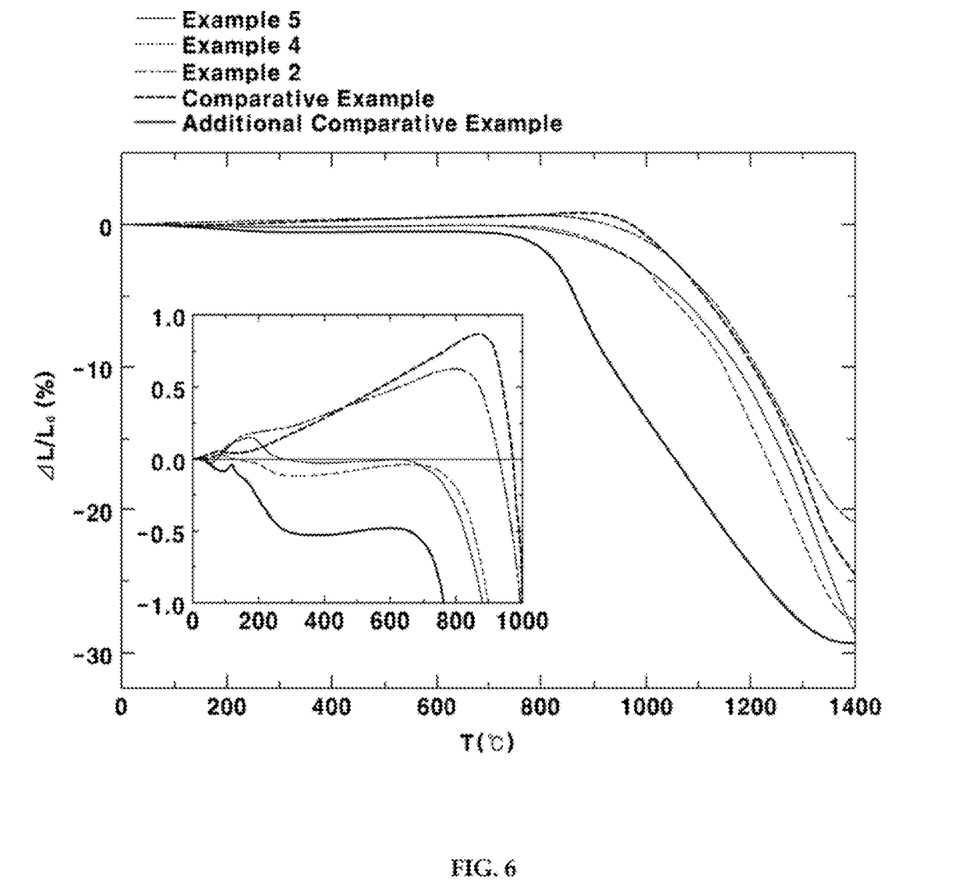
FIG. 6 illustrates a result of measuring linear thermal expansion for Example 2, Example 4 and Example 5.

The oxygen storage materials of Example 2, Example 4, Example 5, Comparative Example and Additional Comparative Example were compressed in a mold with a diameter ($\Phi$) of 10 mm under a pressure of 30 MPa to prepare samples with a thickness of about 3.8 mm. It was observed whether the samples were sintered and shrank while raising temperature from room temperature to 1400° C. (at a rate of 5° C./min) under air atmosphere. The result is shown in FIG. 6.

For Additional Comparative Example, a complex wherein cobalt oxide was simply supported on a ceria-zirconia solid solution as described in the patent document was used. The complex comprises 10 mol % of cobalt.

Cobalt oxide is known to exhibit sintering shrinkage behavior around 800° C. However, referring to FIG. 6, no sintering shrinkage behavior was observed for Example 2, Example 4, Example 5. This was confirmed from the result of Comparative Example similar to the results of Examples 2, 4 and 5.

In contrast, Additional Comparative Example, wherein cobalt oxide was simply supported, showed entirely different sintering shrinkage behavior although the cobalt content was the same as Example 2.

Accordingly, it was confirmed that the oxygen storage material according to the present invention does not have a problem about structural stability.

The ceria-zirconia (CZO)-based multi-scaled oxygen storage material according to the present invention has high oxygen storage and release ability and can maintain structural stability even at high temperature.

Accordingly, the oxygen storage material can be usefully used in three-way catalysts for purifying exhaust gas from internal combustion engines such as diesel or gasoline engines, anode supports for fuel cells for inhibiting carbon coking, oxygen sensors, oxygen suppliers necessary for purifying wastewater, oxygen suppliers for chemical looping used to prepare $N_2$, $H_2$, CO and $CO_2$ by separating air, and so forth.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A multi-scaled oxygen storage material comprising:
   a ceria-zirconia solid solution;
   a cobalt dopping included in the solid solution in a form of an atom at a saturation concentration; and
   a cobalt-based nanocluster dispersed in the solid solution in a form of cobalt oxide.

2. The multi-scaled oxygen storage material according to claim 1, wherein the cobalt-based nanocluster is included at a concentration of more than 0 to equal to or less than 45 mol %.

3. A method for preparing the multi-scaled oxygen storage material according to claim 2, which comprises:
   (a) stirring a mixture of cerium nitrate ($Ce(NO_3)_3 \cdot 6H_2O$), zirconium nitrate ($ZrO(NO_3)_2$), cobalt nitrate ($Co(NO_3)_2 \cdot 6H_2O$) and glycine, and then reacting the mixture; and
   (b) calcining the mixture.

4. A method for preparing the multi-scaled oxygen storage material according to claim 1, which comprises:
   (a) stirring a mixture of cerium nitrate ($Ce(NO_3)_3 \cdot 6H_2O$), zirconium nitrate ($ZrO(NO_3)_2$), cobalt nitrate ($Co(NO_3)_2 \cdot 6H_2O$) and glycine, and then reacting the mixture; and
   (b) calcining the mixture.

* * * * *